(12) United States Patent
Galford et al.

(10) Patent No.: US 11,169,300 B1
(45) Date of Patent: Nov. 9, 2021

(54) GAMMA LOGGING TOOL ASSEMBLY

(71) Applicant: Halliburton Energy Services, Inc., Houston, TX (US)

(72) Inventors: James E. Galford, Missouri City, TX (US); Ryan Damont Green, League City, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 214 days.

(21) Appl. No.: 16/613,956

(22) PCT Filed: Jan. 11, 2019

(86) PCT No.: PCT/US2019/013182
§ 371 (c)(1),
(2) Date: Nov. 15, 2019

(87) PCT Pub. No.: WO2020/145985
PCT Pub. Date: Jul. 16, 2020

(51) Int. Cl.
*G01V 5/12* (2006.01)
*E21B 47/01* (2012.01)

(52) U.S. Cl.
CPC .............. *G01V 5/125* (2013.01); *E21B 47/01* (2013.01)

(58) Field of Classification Search
CPC ................................ G01V 5/125; E21B 47/01
See application file for complete search history.

(56) References Cited

U.S. PATENT DOCUMENTS

| | | | | |
|---|---|---|---|---|
| 5,091,644 A | * | 2/1992 | Minette | E21B 47/00 250/254 |
| 5,120,963 A | * | 6/1992 | Robinson | G01V 5/04 250/361 R |
| 5,134,285 A | * | 7/1992 | Perry | E21B 47/017 250/269.3 |
| 5,397,893 A | * | 3/1995 | Minette | E21B 47/017 250/254 |
| 5,419,395 A | * | 5/1995 | Harvey | E21B 47/01 166/241.6 |
| 5,448,227 A | * | 9/1995 | Orban | E21B 7/068 340/854.4 |
| 6,288,548 B1 | * | 9/2001 | Thompson | G01V 3/30 324/339 |

(Continued)

FOREIGN PATENT DOCUMENTS

CN  102707325 A  10/2012

OTHER PUBLICATIONS

PCT Application Serial No. PCT/US2019/013182, International Search Report, dated Oct. 10, 2019, 3 pages.

(Continued)

*Primary Examiner* — Blake C Riddick
(74) *Attorney, Agent, or Firm* — Gilliam IP PLLC (57) ABSTRACT

Disclosed embodiments include a gamma logging detector assembly that includes a detector support structure comprising one or more high density alloy materials and including a first cylindrical drill collar segment and a second cylindrical drill collar segment each having a radius of at least R1. A third cylindrical drill collar segment is disposed axially between the first and second cylindrical drill collar segments to form an annular channel over the third cylindrical drill collar segment and between the first and second cylindrical drill collar segments. The third cylindrical drill collar segment includes an inwardly defined open cavity and a radius, R2, that is less than R1. An annular pressure sleeve comprising one or more low density alloy materials is disposed within the annular channel.

20 Claims, 3 Drawing Sheets

(56) References Cited

U.S. PATENT DOCUMENTS

| | | | |
|---|---|---|---|
| 2002/0057210 A1* | 5/2002 | Frey | G01V 11/002 340/854.3 |
| 2003/0056984 A1* | 3/2003 | Smith | E21B 47/017 175/40 |
| 2004/0000401 A1* | 1/2004 | Sale | G01V 5/125 166/254.2 |
| 2004/0065823 A1 | 4/2004 | Mickael | |
| 2004/0104821 A1* | 6/2004 | Clark | G01V 11/002 340/854.6 |
| 2004/0178337 A1* | 9/2004 | Kurkoski | G01T 3/08 250/269.4 |
| 2004/0257912 A1* | 12/2004 | Dubinsky | G10K 9/12 367/81 |
| 2005/0109097 A1* | 5/2005 | Bogath | E21B 47/01 73/152.49 |
| 2006/0102834 A1 | 5/2006 | Mickael | |
| 2007/0205021 A1* | 9/2007 | Pelletier | E21B 49/10 175/59 |
| 2009/0025982 A1* | 1/2009 | Hall | E21B 47/01 175/76 |
| 2009/0276158 A1* | 11/2009 | Kirkwood | G01V 5/101 702/8 |
| 2010/0132434 A1 | 6/2010 | Moake | |
| 2010/0155137 A1* | 6/2010 | Hall | G01V 5/10 175/41 |
| 2012/0192640 A1* | 8/2012 | Minh | E21B 7/06 73/152.16 |
| 2013/0075163 A1* | 3/2013 | Harms | E21B 17/20 175/57 |
| 2013/0239673 A1* | 9/2013 | Garcia-Osuna | E21B 47/017 73/152.46 |
| 2014/0343857 A1 | 11/2014 | Fruhman et al. | |
| 2015/0053393 A1* | 2/2015 | Ortiz | G01V 5/10 166/66 |
| 2016/0130932 A1* | 5/2016 | Logan | E21B 17/003 166/66 |
| 2017/0242153 A1* | 8/2017 | Yang | E21B 47/026 |
| 2017/0335674 A1* | 11/2017 | Laban | E21B 44/005 |
| 2019/0227189 A1* | 7/2019 | Lentz | G01V 5/12 |

OTHER PUBLICATIONS

PCT Application Serial No. PCT/US2019/013182, International Written Opinion, dated Oct. 10, 2019, 5 pages.

\* cited by examiner

GAMMA LOGGING TOOL ASSEMBLY

BACKGROUND

Production and injection wells are frequently formed by drilling boreholes that traverse subterranean formations. Borehole measurements such as nuclear magnetic resonance (NMR) and gamma radiation measurements may be performed using a wireline configuration in which drilling equipment is withdrawn from the borehole and the measurement instruments inserted by wireline. Another technique for deploying measurement instrumentation at various positions along a borehole is known as logging while drilling (LWD) also referred to as measurement while drilling (MWD). LWD is a measurement technique that deploys logging tools, such as gamma ray measurement tools, within a borehole during a drilling operation as part of the lowermost bottom hole assembly (BHA) portion of the drill string.

BRIEF DESCRIPTION OF THE DRAWINGS

The disclosed embodiments may be better understood by referencing the accompanying drawings.

DETAILED DESCRIPTION OF EMBODIMENTS

The description that follows includes example systems, methods, techniques, and program flows that embody aspects of the disclosure. However, it is understood that this disclosure may be practiced without one or more of these specific details. In some instances, well-known instruction instances, protocols, structures and techniques have not been shown in detail in order not to obfuscate the description.

Overview

LWD may be used to implement natural gamma ray logging in which naturally occurring, or non-induced, gamma radiation is measured by scintillation detectors deployed in a BHA. Measurement of naturally occurring gamma radiation may be used for borehole imaging, and other purposes, during or after drilling. Borehole imaging may be utilized as an input for directional drilling to optimize the positioning of wellbores within target hydrocarbon formations. The encoded imaging information is utilized to guide the directional drilling of boreholes such as for determining the direction of drilling during LWD operations.

Naturally occurring gamma radiation is typically characterized by low count intensity. Natural gamma radiation logging, including spectral gamma radiation logging, is particularly sensitive to material composition and configuration of BHA components, which may attenuate incoming gamma radiation. Additionally, mechanical disturbances, including shock and vibration during LWD operation, may distort the results of spectral gamma measurements. Disclosed embodiments include a detector assembly apparatus and drilling system configured to increase measured gamma ray counts during LWD logging in which a natural gamma ray logging tool is deployed within a drill string.

The detector assembly may include a detector support structure comprising first and second cylindrical segments having a first radius, and a third cylindrical segment disposed axially between the first and second cylindrical segments. The third cylindrical segment has second radius that is less than the first radius and also includes one or more inwardly defined open cavities. The first, second, and third cylindrical segments form a detector support structure for a logging tool. The logging tool may comprise a gamma radiation sensor and an electronics package disposed within a respective one or more of the open cavities. An annular pressure sleeve is disposed within an open channel formed over the third cylindrical segment and between the first and second cylindrical segments.

Forming part of the drill collar, the first, second, and third cylindrical segments are fabricated using one or more high density alloy materials. The pressure sleeve is fabricated using an alloy having a relatively low density, low atomic number, and relatively high metallurgic strength. For example, the pressure sleeve may comprise a titanium alloy having low gamma scattering and high metallurgic toughness characteristics such as a Ti-6AL-2SN-4ZR-6MO alloy. The pressure sleeve material is substantially less dense and has a lower effective atomic number than the materials of which the first, second, and third cylindrical segments are fabricated. The low density, low effective atomic number material presents a reduced gamma attenuation barrier that also provides sufficient metallurgic toughness to withstand substantial downhole fluid pressure. The circumferentially recessed third cylindrical segment in combination with the pressure sleeve material further permits flexure of the drill string proximate to the detector assembly that relieves bending stresses otherwise incurred by logging tool components during drilling.

Example Illustrations

Figure 1:
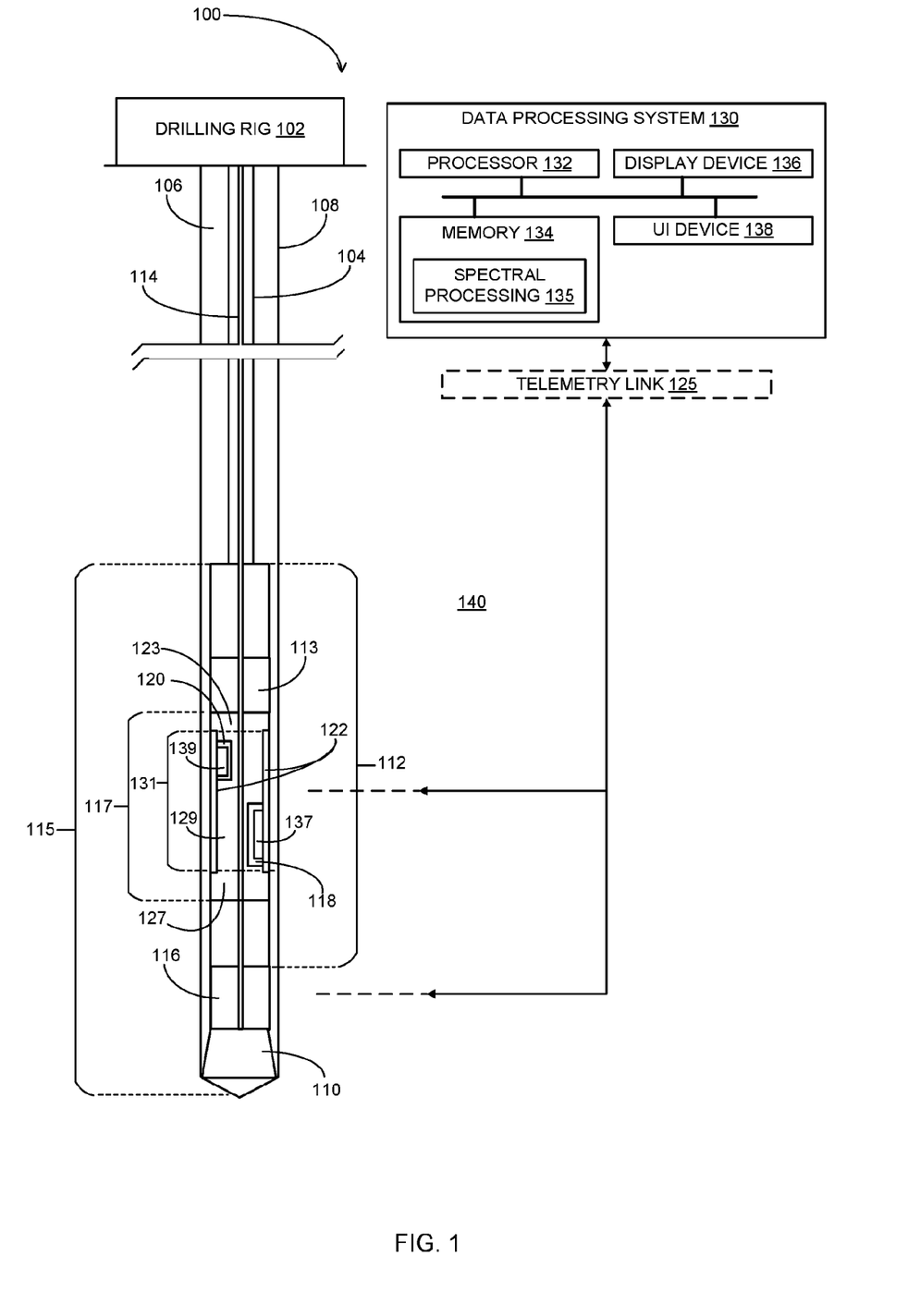
FIG. 1 is a block diagram depicting a drilling system that incorporates a gamma detector assembly in accordance with some embodiments.

FIG. 1 is a block diagram depicting a drilling system 100 that is configured to collect and utilize spectral gamma radiation information during logging while drilling (LWD) operations in accordance with some embodiments. Drilling system 100 includes a drilling rig 102 comprising various mechanical and electronic systems, subsystems, devices, and components configured to lower, rotate, and otherwise operate a drill string. The drill string includes, among other components, a section of drill piping 104 coupled at one end to a top drive (not depicted) within drilling rig 102. Drill piping 104 coupled at the other end to a bottom hole assembly (BHA) 115 that includes a drill bit 110 on its lower end. BHA 115 further includes a steering actuator 116 configured either as a rotary steering system or motor driven device to determine the drilling direction by adjusting the direction in which drill bit 110 is pointed.

Drill bit 110 may be actuated by rotation imparted to the drill string by the top drive within drilling rig 102. A borehole 106 having a cylindrically contoured borehole wall 108 is formed as drill bit 110 is rotated within a formation 140. As drill bit 110 rotates, a pump (not depicted) within drilling rig 102 pumps drilling fluid, sometimes referred to as "drilling mud," downward through a drilling fluid conduit 114 that is formed within the various sections of the drill string. The drilling fluid cools and lubricates drill bit 110 as it exits drill bit 110.

BHA 115 further includes a drill collar 112 that provides downward weight force on drill bit 110 for drilling. Drill collar 112 comprises one or more thick-walled cylinders machined from various relatively high density metals or metallic alloys such as carbon steel or a nickel alloy. While not expressly depicted in FIG. 1, drill collar 112 may comprise multiple distinct cylindrical members that are interconnected using releasable connections such as threaded connectors integral to the individual drill collar members. In some instances, multiple interconnected cylinders may be collectively referred to as a drill collar and in other instances each cylinder may be referred to individually as a drill collar. In addition to providing the downward force on drill bit 110, drill collar 112 includes structures for protectively deploying downhole measurement logging tools used to detect geological formation information as well as measuring various environmental drilling parameters.

A measurement tool 113 is deployed within a section of drill collar 112 and is configured, using various sensor and support electronics components, to measure and record drilling parameters such as the position and orientation of BHA 115. Measurement tool 113 may be further configured, using various sensor and support electronics components, to measure and record downhole environment conditions such as downhole pressure and temperature proximate BHA 115. The drilling parameters and downhole environment information collected by measurement tool 113 is transmitted to a surface processing system, such as a data processing system 130 via a telemetry link 125. Telemetry link 125 includes transmission media and endpoint interface components configured to employ a variety of communication modes. The communication modes may comprise different signal and modulation types carried using one or more different transmission media such as acoustic, electromagnetic, and optical fiber media.

Drill collar 112 is further configured to support a gamma logging detector assembly 117 that includes components for measuring and recording total and/or spectral natural gamma radiation emitted from radioelement concentrations within formation 140. Detector assembly 117 further includes information processing and communication components for transmitting the collected total and/or spectral gamma radiation information via telemetry link 125 to data processing system 130. Detector assembly 117 includes, in part, a detector support structure comprising all or portions of one or more interconnected cylindrical drill collar members that make up the overall drill collar 112. The drill collar member(s) and/or portions thereof forming the detector support structure may be referred to as drill collar segments and comprise relatively dense metallic members, such as steel and/or nickel alloys having a density of at least 7 grams per cubic centimeter.

In contrast to typical drill collar construction, the drill collar segments forming the detector support structure within detector assembly 117 have axially varying circumferential contouring. As shown, the dense metallic material portions of the detector support structure include cylindrical drill collar segments 123 and 127 forming the axial ends of detector assembly 117. Drill collar segments 123 and 127 of detector assembly 117 are structurally and materially consistent, each comprising a cylindrical volume of one or more metals and/or alloys displaced only by a corresponding section of the relatively narrow drilling fluid conduit 114.

Detector assembly 117 further includes a mandrel section 131 bounded by the opposing inner surfaces of drill collar segments 123 and 127. Mandrel section 131 comprises a recessed cylindrical mandrel segment 129 axially disposed between drill collar segments 123 and 127. The position and outer contour of mandrel segment 129 with respect to drill collar segments 123 and 127 forms an annular channel over mandrel segment 129 and between drill collar segments 123 and 127 in which an annular pressure sleeve 122 is disposed. In some embodiments, annular pressure sleeve 122 is a structurally and compositionally distinct component that is not materially integral with the drill collar metals/alloys of which cylindrical segments 123 and 127 and mandrel segment 129 are fabricated. As a discrete component, pressure sleeve 122 has an inner cylindrical surface that contacts an outer cylindrical surface of mandrel segment 129. The recessed mandrel segment 129 may be compositionally consistent with and structurally integral with one or both of the dense metallic end segments 123 and 127 of detector assembly 117.

Within mandrel section 131, mandrel segment 129 includes an inwardly defined open cavity 118 within which a gamma radiation sensor 137, such as a scintillation-type gamma sensor, is disposed. Mandrel segment 129 further includes an additional inwardly defined open cavity 120 within which an electronics package 139 for the sensor is disposed. Unlike the annular channel within which pressure sleeve 122 is disposed, open cavities 118 and 120 result in a circumferentially uneven contour of the section of dense drill collar material over the respective axial extents of the cavities.

As depicted, pressure sleeve 122 is disposed directly over the recessed mandrel member 129, providing a fluid and fluid pressure seal for gamma sensor 137 and electronics package 139 disposed within open cavities 118 and 120, respectively. The thickness of pressure sleeve 122 is determined based, at least in part, on the surface areas of cavities 118 and 120 in combination with the material composition of pressure sleeve 122. The material composition of pressure sleeve 122 is selected to minimize gamma ray attenuation while maintaining a pressure barrier within borehole 106 that is sufficient to protect components carried in the pressure sleeve 122, and to carry out drilling operations. In some embodiments, pressure sleeve 122 is uniformly fabricated of a low density alloy such as a titanium alloy having adequate metallurgic toughness to withstand high pressure and other forces at high temperatures. Such forces may include column fluid pressure within borehole 106 and flexural stresses imparted by operation of the drill string. In some embodiments, pressure sleeve 122 comprises an alpha-beta titanium alloy that maintains high strength to at least a temperature of 450° C. For example, pressure sleeve 122 may comprise a Ti-6AL-2SN-4ZR-6MO alloy comprising 82% titanium, 6% aluminum, 2% tin, 4% zirconium, and 6% molybdenum. The titanium alloy used to fabricate pressure sleeve 122 is substantially lower in bulk density and effective atomic number than the metals/alloys used to fabricate the denser cylindrical drill collar segments 123 and 127 and mandrel segment 129.

In combination, gamma sensor 137 and electronics package 139 form a gamma logging tool configured to detect, records, and transmit naturally occurring gamma radiation emitted from formation materials, particularly radioelements that are present at various amounts and concentrations. Such radioelements typically includes various isotopes of the thorium and uranium decay chains, and potassium. The low gamma scattering material properties of pressure sleeve 122, such as when comprising Ti-6AL-25N-4ZR-6MO alloy, enable increased gamma ray counts to penetrate and be detected by gamma sensor 137 than would otherwise occur using a denser pressure sleeve material.

During drilling operations, information from the logging tool that includes gamma sensor 137 and from measurement tool 113 are processed by a surface data processing system 130 to determine and modify the drilling direction of drill bit 110 within formation 140. For instance, data processing system 130 may comprise processing components configured to derive formation material properties from raw and/or pre-processed natural gamma radiation measurements collected by the logging tool components including gamma sensor 137 and electronics package 139. The logging tool may be configured as a spectral gamma logging tool with gamma sensor 137 configured as a spectral gamma sensor that collects spectral gamma radiation information that may be transmitted to data processing system 130 in real-time or subsequent to drilling operation.

The radiation and/or spectral information that is collected by components within detector assembly 117 may include counts and detected energy levels that may be transmitted as information via telemetry link 125 to data processing system 130. In some embodiments, data processing system 130 comprises a spectral processing components 135 configured to generate spectral component data from the detected gamma radiation. For embodiments in which the spectral gamma information is transmitted in real-time, the formation material properties information generated by data processing system 130 from the spectral information may be used to generate drill bit direction instructions. The direction instructions may be transmitted from data processing system to steering actuator 116 via telemetry link 125.

Data processing system 130 includes a processor 132, a display device 136, and a memory device 134 into which spectral processing components 135 are loaded. Spectral processing components 135 comprise program instructions configured to determine formation properties such as material composition based, at least in part, on the measurement information from detector assembly 117. In some embodiments, spectral processing components 135 may further include an imaging component comprising program instructions configured to generate borehole azimuthal image information. The borehole azimuthal image information may describe, such as by color-coding or otherwise, the material composition of formation materials proximate to BHA 115 based on the determined formation properties. The azimuthal image information may be displayed as an optical image on display device 136. Data processing system 130 may further include a user input device 138 that may be used to generate and send directional drilling instructions based, at least in part, on the formation properties. The directional drilling instructions may be transmitted by data processing system 130 to steering actuator 116 via telemetry link 125.

Figure 2A:
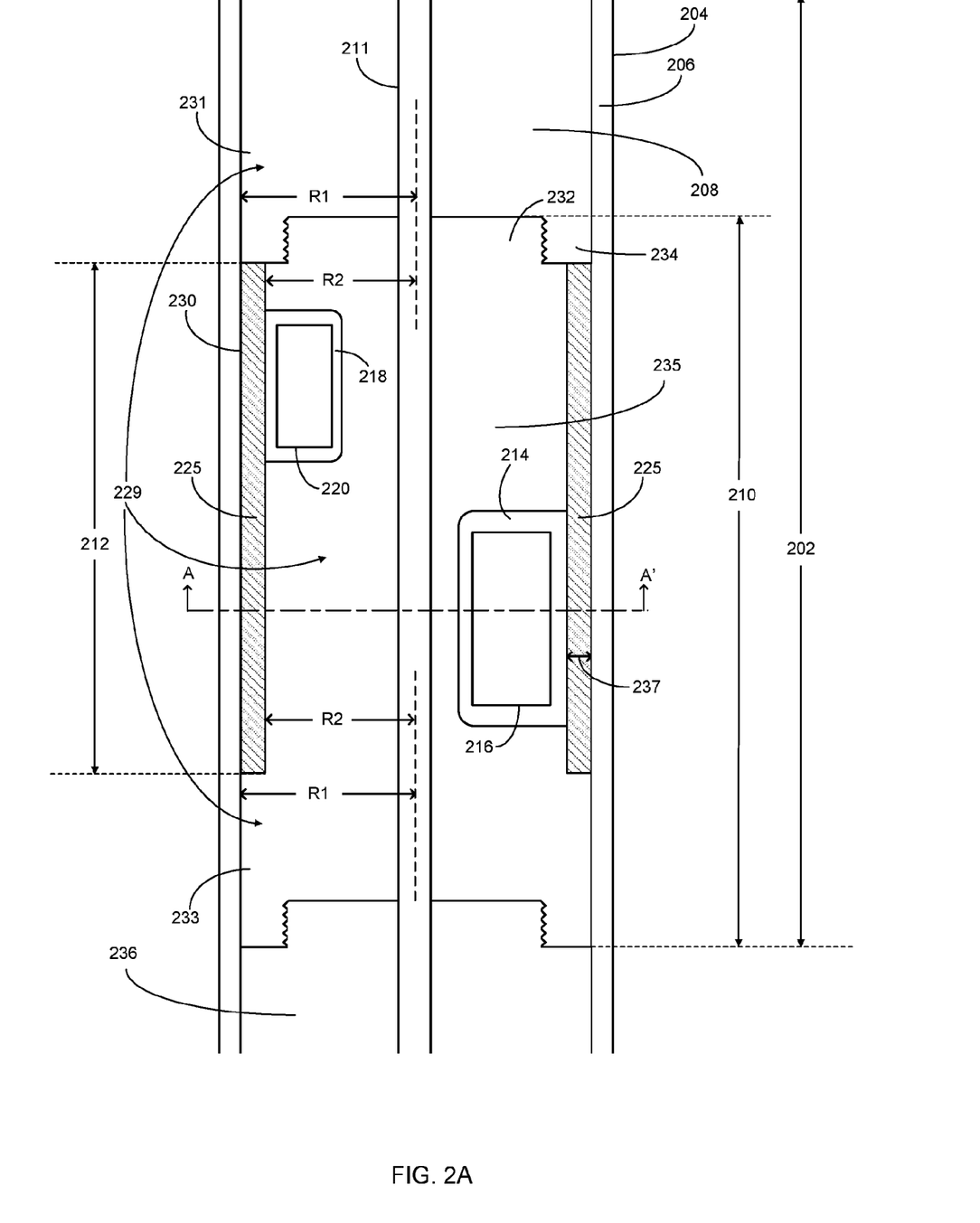
FIG. 2A illustrates a side cross-section view of a portion of a drill collar in which a gamma detector assembly is deployed in accordance with some embodiments.

FIG. 2A illustrates a side cross-section view of a portion of a drill collar such as drill collar 112 comprising a detector assembly 202 in accordance with some embodiments. The depicted drill collar portion is positioned within a cylindrical borehole 206 defined by a borehole wall 204 and containing formation and drilling fluids that exert substantial pressure on the outer components of the drill collar. The depicted drill collar portion includes a first drill collar member 208 and a second drill collar member 210. Drill collar members 208 and 210 each comprise a discrete thick-wall tubular manufactured from a solid bar of high density alloy material such as alloy steel or other relatively dense metallic material such as a nickel alloy. Drill collar members 208 and 210 may be fabricated of a same alloy or a different alloy. The outer contours of drill collar members 208 and 210 are substantially cylindrical although the respective surfaces may be finished as slick or spiraled depending on the desired mechanical and fluid dynamic properties. For example, the outer surfaces of drill collar members 208 and/or 210 may be finished to have spiral grooves to promote even flow of drill fluid around the collar diameter within borehole 206.

The mutually opposing ends of drill collar members 208 and 210 are releasably connected by rotational engagement of a threaded end of 232 of drill collar member 208 with a threaded end 234 of drill collar member 210. Similarly, the overall drill collar that includes members 208 and 210 may further include a third drill collar member 236 connected by threaded engagement at the other end of drill collar member 210. Each of drill collar members 208, 210, and 236 include respective portions of a drilling fluid conduit 211, which in the depicted embodiment is disposed at the center of the overall apparatus.

Detector assembly 202 includes drill collar member 210 as well as at least a portion of drill collar member 208. The drill collar member portions of detector assembly 202 are contoured to form a detector support structure 229 comprising portions of the steel or nickel alloy of which drill collar members 208 and/or 210 are fabricated. Detector support structure 229 includes a first end comprising a first cylindrical segment 231 formed by the depicted lower portion of drill collar member 208. Detector support structure 229 includes a second end axially opposing the first end and comprising a second cylindrical segment 233 formed by the lower portion of drill collar member 210. In the depicted embodiment, the first and second cylindrical segments 231 and 233 forming the ends of detector support structure 229 have a radius R1 and terminate at the depicted bounds of a depicted mandrel section 212 of detector assembly 202. In some embodiments, drill collar members 208 and 210 and/or or segments thereof such as cylindrical segments 231 and 233 may have different radii. For example, the radius of cylindrical segment 231 may be greater than or less than the radius of cylindrical segment 233.

Mandrel section 212 includes a recessed portion of dense drill collar material forming the intermediary portion of detector support structure 229 in the form of a recessed cylindrical mandrel 235 that is materially integral to drill collar member 210. As shown, the recessed mandrel 235 forming the depicted upper portion of drill collar member 210 has a radius of R2 that is substantially less than R1 to form an annular channel 237 in which an annular pressure sleeve 225 is disposed. Annular channel 237 is formed over the surface area of the recessed cylindrical drill collar segment comprising mandrel 235 and between the first and second cylindrical segments 231 and 233 that bound mandrel section 212. In some embodiments in which the outer radius, R1, of the drill collar members is between 8.89 cm (3.5 inches) and 11.43 cm (4.5 inches), the difference between R1 and R2 is at least 0.572 cm (0.225 inches).

Detector assembly 202 further includes a cavity 214 inwardly defined at a first axial position within mandrel 235. A gamma radiation detector 216 is disposed within cavity 214. Gamma radiation detector 216 may comprise a scintillometer device configured to measure the number and energy intensity of naturally occurring gamma rays emitted by formation material. Gamma radiation detector 216 is configure in to detect incoming natural gamma radiation through annular pressure sleeve 225. During a measurement cycle, individual gamma rays of the overall gamma radiation pass through pressure sleeve 225 and strike a measurement medium within detector 216 such as a scintillation crystal and may or may not be absorbed. In response to absorption of a gamma ray, the crystal generates a light energy flash. The light energy flash may be detected by a photomultiplier within detector 216 that converts the light flash into an electrical pulse that is counted by detector 216. Detector 216 may be secured within cavity 214 using mechanical and/or adhesive fasteners.

Detector assembly 202 includes at least one other inwardly defined cavity 218 within mandrel 235. Cavity 218 is defined at a second position that is both radially and axially offset from the first position of cavity 214 along the length of mandrel 235. An electronics package 220 is disposed within cavity 218 and includes components for providing electrical power and control for radiation detector 216. Electronics package 220 may further include data processing circuitry configured to process measurement information generated by radiation detector 216. For example, electronics package 220 may include programmed circuitry configured to determine intensity in terms of count rate and energy levels of the detected naturally occurring gamma radiation.

Forming part of detector assembly 202, pressure sleeve 225 is disposed within an annular channel 237 formed by the difference in radius between the recessed cylindrical segment forming mandrel 235 and cylindrical segments 231 and 233. As shown, pressure sleeve 225 is disposed along the recessed segment such that the inner cylindrical surface of pressure sleeve 225 non-bindingly contacts the outer cylindrical surface of mandrel 235. In this manner, pressure sleeve 225 may be slidably inserted and removed from the annular channel when drill collar member 208 is rotationally disengaged from drill collar member 210 to install or otherwise provide access to detector 216 and electronics package 220 within exposed open cavities 214 and 218. In the depicted embodiment, the thickness of pressure sleeve 225 is selected to match the difference between radius, R1, and the radius, R2, of mandrel 235.

For nuclear radiation logging systems, measurement precision is determined in significant part by maximizing count rate. To optimize natural gamma detection, pressure sleeve 225 is comprised of a low density metallic alloy that provides fluid pressure shielding for radiation detector 216 and electronics package 220 while minimizing attenuation of incoming gamma radiation. The amount of gamma radiation attenuation within pressure sleeve 225 is an exponential function of the sleeve thickness structural feature of pressure sleeve 225. Gamma radiation attenuation is also a function of the material density and gamma scattering cross-section compositional features of pressure sleeve 225. To reduce gamma attenuation while maintaining sufficient mechanical strength and fatigue resistance, pressure sleeve 225 comprises a low-density, low effective atomic number (low-Zell), and high-strength alloy material.

In some embodiments, pressure sleeve 225 is an integral annular member having a thickness between 0.572 cm (0.225 inches) and 0.699 cm (0.275 inches) and comprising an alloy having a bulk density equal to or less than approximately 5 grams per cubic centimeter, and an effective atomic number equal to or less than approximately 30. To this end, and in some embodiments, pressure sleeve 225 may be an integral annular component uniformly comprising a Ti-6AL-2SN-4ZR-6MO alloy. During drilling, bending moments may be imparted to various portions of a drill string such as the depicted drill string portion depicted in FIG. 2A. The dense alloy cross-section is reduced along the recessed segment formed by mandrel 235 and cavities 214 and 218 formed within mandrel 235. The reduced cross-section results in a potentially increased bending moment over the span of detector assembly 202. In addition to imparting relatively low gamma attenuation, a Ti-6AL-2SN-4ZR-6MO alloy formed into an annular sleeve having a thickness between 0.572 and 0.699 cm (0.225 and 0.275 inches) provides flexure proximate to the detector assembly 202. Having a thickness of between 0.572 and 0.699 cm (0.225 and 0.275 inches) and fabricated of a Ti-6AL-2SN-4ZR-6MO alloy, pressure sleeve 225 allows mechanical flexure of mandrel 235 proximate to radiation detector 216 and electronic package 220 thereby relieving mechanical bending stresses the logging tool components would otherwise incur during drilling.

Figures 2B, 3:
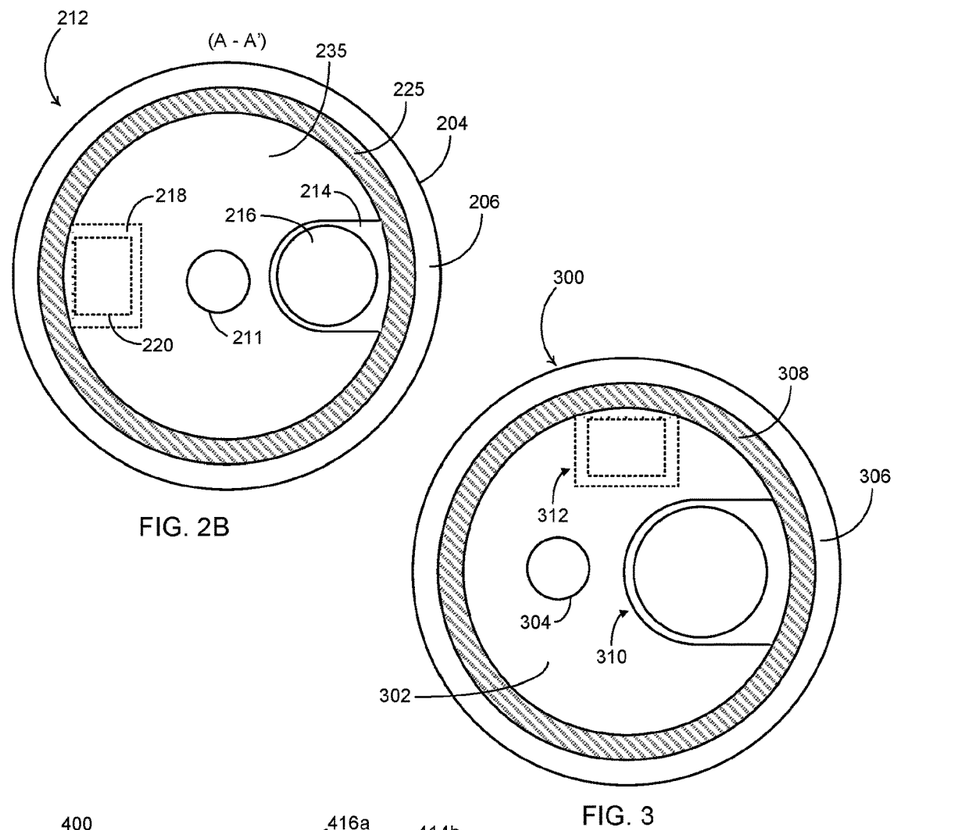
FIG. 2B depicts a transverse cross-section view of the portion of the drill collar illustrated in FIG. 2A.
FIG. 3 illustrates a transverse cross-section view of a portion of a drill collar in which a gamma detector assembly is deployed in accordance with some embodiments.

FIG. 2B illustrates the transverse A-A' cross-section view of mandrel section 212 of the gamma detector assembly illustrated in FIG. 2A. Included in the cross-section view are cavities 214 and 218, and drilling fluid conduit 211 all diametrically aligned within the mandrel 235 portion of drill collar member 210. Cavity 214 is semi-cylindrically contoured to securely and efficiently encase cylindrically contoured gamma radiation detector 216. Cavity 214 may vary in contour as well as dimensions depending on the dimensions and contouring of radiation detector 216.

Cavity 218 is rectangularly contoured to securely encase rectangularly contoured electronics package 220. As is the case for cavity 214, cavity 218 may vary in contour and dimension depending on the dimensions and contour of electronics package 220. Cavity 218 and electronics package 220 are depicted as shadow components using dashed lines to indicate the axial offset between cavity 214 and cavity 218. Consistent with FIG. 2A, the cross-section view of FIG. 2B depicts the relative disposition of pressure sleeve 225 as disposed on the outer surface of the recessed mandrel 235 portion drill collar member 210 to provide fluid and pressure shielding over the otherwise open cavities 214 and 218.

FIG. 3 illustrates a transverse cross-section view of a portion of a drill collar on which a gamma detector assembly is deployed in accordance with some embodiments. In combination with the dimensions and material composition features of the pressure sleeve, the sizing and relative disposition of the gamma detector may affect gamma count rates. As shown in FIG. 3, the detector assembly components include a recessed mandrel segment of a drill collar member 302 equivalent to mandrel 235 depicted in FIGS. 2A and 2B. The embodiment further includes a pressure sleeve 308 that provides fluid and pressure shield from column fluid pressure within a borehole 306. Pressure sleeve 308 may be contoured and composed of a titanium alloy, similar to or identical to that depicted and described with reference to pressure sleeve 225 in FIG. 2A.

In contrast to the embodiment shown in FIGS. 2A and 2B, the structural components within the recessed mandrel segment of a drill collar member 302 are not diametrically aligned. Instead, an electronics package cavity 312 is disposed approximately at a circumferentially 90° offset position with respect to a gamma detector cavity 310. Furthermore, a drilling fluid conduit 304 may be positioned in a non-centered position and offset in a direction away from the position of gamma detector cavity 310 in order to provide sufficient space to increase the detector/cavity size. The depicted offset positioning of conduit 304 and electronics package cavity 312 provides a larger cross-section space within which a larger gamma detector may be disposed in the larger gamma detector cavity 310. The configuration depicted in FIG. 3 may increase gamma count rates for natural gamma logging due to the provision of additional gamma absorption volume for the relatively high energies of characteristic potassium, thorium, and uranium gamma radiation.

Figure 4:
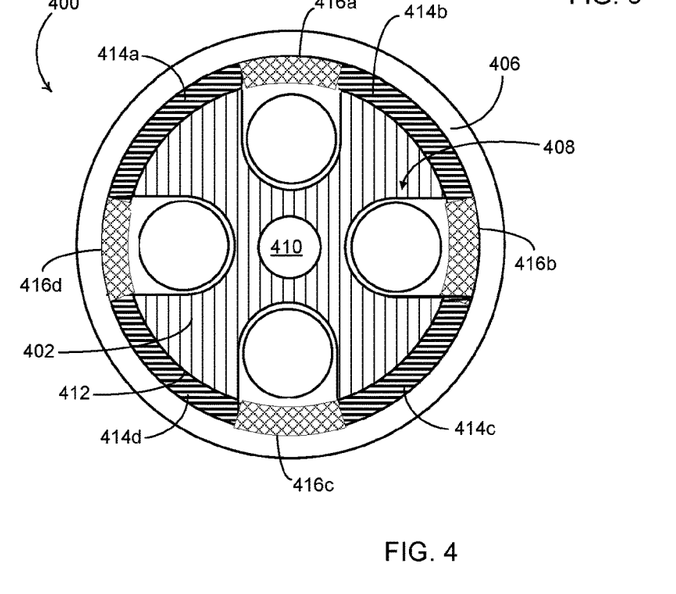
FIG. 4 illustrates a transverse cross-section view of a portion of a drill collar in which a gamma detector assembly is deployed in accordance with some embodiments.

FIG. 4 illustrates a transverse cross-section view of a mandrel section 400 of a drill collar on which a gamma detector assembly is configured to include gamma windows in accordance with some embodiments. As shown in FIG. 4, the detector assembly components include a recessed cylindrical mandrel 402 of a drill collar member equivalent to the recessed mandrel 235 depicted in FIGS. 2A and 2B. In the depicted embodiment, four gamma detector cavities including detector cavity 408 are distributed evenly around the circumference of mandrel 402 that includes a drilling fluid conduit 410 at its center. The depicted detector assembly further includes a pressure sleeve that is not uniformly comprised of a single low-density, low-Zeff alloy. Instead, the depicted pressure sleeve includes gamma measurement windows in the form of four azimuthal sections 414a-414d comprised of a low density, low-Zeff alloy.

The depicted pressure sleeve further includes four azimuthal sections 416a-416d comprising a higher density alloy disposed in an interleaved manner with respect to azimuthal sections 414a-414d. As shown, the pressure sleeve is azimuthally aligned with respect to cylindrical mandrel 402 such that each of sections 414a-414d is disposed over an opening of a respective one of the gamma detector cavities and each of sections 416a-416d is disposed between a respect pair of detector cavities. In this configuration, the alloy of which azimuthal sections 414a-414d are fabricated may comprise Ti-6AL-2SN-4ZR-6MO to provide a low-attenuation gamma window into the detector cavities. In some embodiments, azimuthal sections 414a-414d may be fabricated using a beryllium alloy. Sections 416a-416d may be fabricated using an alloy having a higher density such as the same or substantially similar alloys used to fabricate cylindrical mandrel 402.

Variations

While the aspects of the disclosure are described with reference to various implementations and exploitations, it will be understood that these aspects are illustrative and that the scope of the claims is not limited to them. Many variations, modifications, additions, and improvements are possible. Plural instances may be provided for structures, components, or operations described herein as a single instance. In general, structures and functionality presented as separate components in the example configurations may be implemented as a combined structure or component. Similarly, structures and components presented as a single component may be implemented as separate structures and components.

Computer program code for carrying out operations for aspects of the disclosure may be written in any combination of one or more programming languages, including an object oriented programming; a dynamic programming language; a scripting language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

Use of the phrase "at least one of" preceding a list with the conjunction "and" should not be treated as an exclusive list and should not be construed as a list of categories with one item from each category, unless specifically stated otherwise.

EXAMPLE EMBODIMENTS

Example embodiments include the following:

Embodiment 1: A gamma logging detector assembly comprising: a detector support structure comprising one or more high density alloy materials and including a first cylindrical drill collar segment and a second cylindrical drill collar segment each having a radius of at least R1, and a third cylindrical drill collar segment having a radius, R2, that is less than R1 and disposed axially between the first and second cylindrical drill collar segments to form an annular channel over the third cylindrical drill collar segment and between the first and second cylindrical drill collar segments, the third cylindrical drill collar segment including an inwardly defined open cavity, and an annular pressure sleeve comprising one or more low density alloy materials disposed within the annular channel.

Embodiment 2: The gamma logging detector assembly of Embodiment 1, wherein the second and third cylindrical drill collar segments are included in an integral drill collar member, said gamma logging detector assembly further including a connector that releasably connects the first cylindrical drill collar segment to the third cylindrical drill collar segment.

Embodiment 3: The gamma logging detector assembly of Embodiments 1-2, wherein the connector comprises a first threaded component at a first end of the second cylindrical drill collar segment and a second threaded component at an end of the first cylindrical drill collar segment that rotationally engages the first threaded component.

Embodiment 4: The gamma logging detector assembly of Embodiments 1-3, wherein the annular pressure sleeve has a density of less than approximately 5 grams per cubic centimeter and an effective atomic number of less than approximately 30.

Embodiment 5: The gamma logging detector assembly of Embodiments 1-4, further comprising a gamma radiation sensor disposed within the open cavity and configured to measure spectral gamma radiation through the annular pressure sleeve.

Embodiment 6: The gamma logging detector assembly of Embodiments 1-5, wherein the annular pressure sleeve has a thickness of at least 0.56 cm (0.22 inches).

Embodiment 7: The gamma logging detector assembly of Embodiments 1-6, wherein the annular pressure sleeve has a thickness approximately equal to the difference between R1 and R2.

Embodiment 8: The gamma logging detector assembly of Embodiments 1-7, wherein third cylindrical drill collar segment includes N inwardly defined open cavities, and wherein the annular pressure sleeve comprises an annular body having N azimuthal sections comprising low density alloy material interleaved with N azimuthal sections comprising a high density alloy material, where N is an integer greater than 1.

Embodiment 9: The gamma logging detector assembly of Embodiments 1-8, wherein the third cylindrical drill collar segment includes one or more inwardly defined open cavities at a first position and one or more inwardly defined open cavities at a second position axially offset from the first position.

Embodiment 10: The gamma logging detector assembly of Embodiments 1-9, wherein the annular pressure sleeve comprises an alpha-beta titanium alloy that maintains structural integrity to at least a temperature of 400° C.

Embodiment 11: The gamma logging detector assembly of Embodiments 1-10, wherein the annular pressure sleeve comprises a Ti-6AL-2SN-4ZR-6MO alloy.

Embodiment 12: A drill string comprising: a first end configured to connect to a drive component; a drill bit disposed at a second end of the drill string; and a drill collar disposed between the drill bit and the first end and that comprises one or more interconnected cylindrical members, wherein a detector assembly portion of the drill collar comprises, first and second cylindrical segments each having a radius of at least R1; a cylindrical mandrel having one or more inwardly defined open cavities and a radius, R2, that is less than R1, and is axially disposed between the first and second cylindrical segments to form an annular channel over the cylindrical mandrel and between the first and second cylindrical segments, and wherein the cylindrical mandrel and the first and second cylindrical segments comprise one or more first alloy materials each having a density of at least D1; and an annular pressure sleeve disposed within the annular channel, wherein the annular pressure sleeve comprises a second alloy material having a density, D2, that is less than D1.

Embodiment 13: The drill string of Embodiment 12, wherein the cylindrical mandrel and first and second cylindrical segments comprise a first alloy having a density of at least 7 grams per cubic centimeter, and wherein the annular pressure sleeve comprises a second alloy having a density less than or equal to about 5 grams per cubic centimeter and an effective atomic number less than or equal to 30.

Embodiment 14: The drill string of Embodiments 12-13, wherein the second alloy material comprises a Ti-6AL-2SN-4ZR-6MO alloy.

Embodiment 15: The drill string of Embodiments 12-14, wherein the second cylindrical segment and the cylindrical mandrel are included in an integral cylindrical member, said drill string further including a releasable connector that connects the first cylindrical segment to the cylindrical mandrel.

Embodiment 16: The drill string of Embodiments 12-15, wherein the cylindrical mandrel includes one or more inwardly defined open cavities at a first axial position and one or more inwardly defined open cavities at a second axial position offset from the first axial position, and wherein the second alloy material comprises a Ti-6AL-2SN-4ZR-6MO alloy.

Embodiment 17: A drilling system comprising: a bottom hole assembly including a detector assembly that comprises one or more drill collar members forming a detector support structure that includes; first and second cylindrical segments each having a radius of at least R1; and a cylindrical mandrel disposed axially between the first and second cylindrical segments and having a radius, R2, that is less than R1 to form an annular channel over the cylindrical mandrel and between the first and second cylindrical segments, wherein the cylindrical mandrel includes an inwardly defined open cavity; a logging tool including a gamma radiation sensor disposed within the open cavity; and an annular pressure sleeve disposed within the annular channel and comprising an alloy having a density equal to or less than 5 grams per cubic centimeter and an effective atomic number equal to or less than 30; and a data processing system communicatively coupled with the logging tool and configured to determine a drill bit direction modification based, at least in part, on measured gamma radiation data generated by the logging tool.

Embodiment 18: The drilling system of Embodiment 17, wherein the annular pressure sleeve has a thickness approximately equal to the difference between R1 and R2.

Embodiment 19: The drilling system of Embodiments 17-18, wherein the annular pressure sleeve comprises a Ti-6AL-2SN-4ZR-6MO alloy.

Embodiment 20: The drilling system of Embodiments 17-19, wherein the cylindrical mandrel includes one or more inwardly defined open cavities at a first axial position and one or more inwardly defined open cavities at a second axial position.

What is claimed is:

1. A gamma logging detector assembly comprising:
    a detector support structure comprising one or more high density alloy materials and including,
        a first cylindrical drill collar segment and a second cylindrical drill collar segment each having a radius of at least R1; and
        a third cylindrical drill collar segment having a radius, R2, that is less than R1 and disposed axially between the first and second cylindrical drill collar segments to form an annular channel over the third cylindrical drill collar segment and between the first and second cylindrical drill collar segments, the third cylindrical drill collar segment including an inwardly defined open cavity; and
    an annular pressure sleeve comprising one or more low density alloy materials disposed within the annular channel.

2. The gamma logging detector assembly of claim 1, wherein the second and third cylindrical drill collar segments are included in an integral drill collar member, said gamma logging detector assembly further including a connector that releasably connects the first cylindrical drill collar segment to the third cylindrical drill collar segment.

3. The gamma logging detector assembly of claim 2, wherein the connector comprises a first threaded component at a first end of the second cylindrical drill collar segment and a second threaded component at an end of the first cylindrical drill collar segment that rotationally engages the first threaded component.

4. The gamma logging detector assembly of claim 1, wherein the annular pressure sleeve has a density of less than approximately 5 grams per cubic centimeter and an effective atomic number of less than approximately 30.

5. The gamma logging detector assembly of claim 1, further comprising a gamma radiation sensor disposed within the inwardly defined open cavity and configured to measure spectral gamma radiation through the annular pressure sleeve.

6. The gamma logging detector assembly of claim 1, wherein the annular pressure sleeve has a thickness of at least 0.56 cm (0.22 inches).

7. The gamma logging detector assembly of claim 1, wherein the annular pressure sleeve has a thickness approximately equal to the difference between R1 and R2.

8. The gamma logging detector assembly of claim 1, wherein the third cylindrical drill collar segment includes N inwardly defined open cavities, and wherein the annular pressure sleeve comprises an annular body having N azimuthal sections comprising low density alloy material interleaved with N azimuthal sections comprising a high density alloy material, where N is an integer greater than 1.

9. The gamma logging detector assembly of claim 1, wherein the third cylindrical drill collar segment includes one or more inwardly defined open cavities at a first position and one or more inwardly defined open cavities at a second position axially offset from the first position.

10. The gamma logging detector assembly of claim 1, wherein the annular pressure sleeve comprises an alpha-beta titanium alloy that maintains structural integrity to at least a temperature of 400° C.

11. The gamma logging detector assembly of claim 10, wherein the annular pressure sleeve comprises a Ti-6AL-2SN-4ZR-6MO alloy.

12. A drill string comprising:
a first end configured to connect to a drive component;
a drill bit disposed at a second end of the drill string; and
a drill collar disposed between the drill bit and the first end and that comprises one or more interconnected cylindrical members, wherein a detector assembly portion of the drill collar comprises,
first and second cylindrical segments each having a radius of at least R1;
a cylindrical mandrel having one or more inwardly defined open cavities and a radius, R2, that is less than R1, and is axially disposed between the first and second cylindrical segments to form an annular channel over the cylindrical mandrel and between the first and second cylindrical segments, and wherein the cylindrical mandrel and the first and second cylindrical segments comprise one or more first alloy materials each having a density of at least D1; and
an annular pressure sleeve disposed within the annular channel, wherein the annular pressure sleeve comprises a second alloy material having a density, D2, that is less than D1.

13. The drill string of claim 12, wherein the cylindrical mandrel and first and second cylindrical segments comprise a first alloy having a density of at least 7 grams per cubic centimeter, and wherein the annular pressure sleeve comprises a second alloy having a density less than or equal to about 5 grams per cubic centimeter and an effective atomic number less than or equal to 30.

14. The drill string of claim 13, wherein the second alloy material comprises a Ti-6AL-2SN-4ZR-6MO alloy.

15. The drill string of claim 12, wherein the second cylindrical segment and the cylindrical mandrel are included in an integral cylindrical member, said drill string further including a releasable connector that connects the first cylindrical segment to the cylindrical mandrel.

16. The drill string of claim 12, wherein the cylindrical mandrel includes one or more inwardly defined open cavities at a first axial position and one or more inwardly defined open cavities at a second axial position offset from the first axial position, and wherein the second alloy material comprises a Ti-6AL-2SN-4ZR-6MO alloy.

17. A drilling system comprising:
a bottom hole assembly including a detector assembly that comprises,
one or more drill collar members forming a detector support structure that includes;
first and second cylindrical segments each having a radius of at least R1; and
a cylindrical mandrel disposed axially between the first and second cylindrical segments and having a radius, R2, that is less than R1 to form an annular channel over the cylindrical mandrel and between the first and second cylindrical segments, wherein the cylindrical mandrel includes an inwardly defined open cavity;
a logging tool including a gamma radiation sensor disposed within the inwardly defined open cavity; and
an annular pressure sleeve disposed within the annular channel and comprising an alloy having a density equal to or less than 5 grams per cubic centimeter and an effective atomic number equal to or less than 30; and
a data processing system communicatively coupled with the logging tool and configured to determine a drill bit direction modification based, at least in part, on measured gamma radiation data generated by the logging tool.

18. The drilling system of claim 17, wherein the annular pressure sleeve has a thickness approximately equal to the difference between R1 and R2.

19. The drilling system of claim 17, wherein the annular pressure sleeve comprises a Ti-6AL-2SN-4ZR-6MO alloy.

20. The drilling system of claim 17, wherein the cylindrical mandrel includes one or more inwardly defined open cavities at a first axial position and one or more inwardly defined open cavities at a second axial position.

* * * * *

UNITED STATES PATENT AND TRADEMARK OFFICE
CERTIFICATE OF CORRECTION

| | |
|---|---|
| PATENT NO. | : 11,169,300 B1 |
| APPLICATION NO. | : 16/613956 |
| DATED | : November 9, 2021 |
| INVENTOR(S) | : Galford et al. |

It is certified that error appears in the above-identified patent and that said Letters Patent is hereby corrected as shown below:

In the Specification

Column 6, Line 64, the phrase -configure in- should read --configured--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*